US012386293B2

(12) United States Patent
Yamashita et al.

(10) Patent No.: US 12,386,293 B2
(45) Date of Patent: Aug. 12, 2025

(54) FIXING DEVICE AND IMAGE FORMING APPARATUS WITH A CONTROLLER TO SWITCH BETWEEN A FIRST HEATING AND A SECOND HEATING

(71) Applicants: Kentaro Yamashita, Kanagawa (JP); Takamasa Hase, Kanagawa (JP); Arinobu Yoshiura, Kanagawa (JP); Daisuke Inoue, Tokyo (JP); Mototaka Iwama, Kanagawa (JP); Ryohhei Sugiyama, Kanagawa (JP)

(72) Inventors: Kentaro Yamashita, Kanagawa (JP); Takamasa Hase, Kanagawa (JP); Arinobu Yoshiura, Kanagawa (JP); Daisuke Inoue, Tokyo (JP); Mototaka Iwama, Kanagawa (JP); Ryohhei Sugiyama, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/627,461

(22) Filed: Apr. 5, 2024

(65) Prior Publication Data

US 2024/0353781 A1 Oct. 24, 2024

(30) Foreign Application Priority Data

Apr. 20, 2023 (JP) ................................ 2023-069423

(51) Int. Cl.
*G03G 15/20* (2006.01)
*G03G 15/00* (2006.01)

(52) U.S. Cl.
CPC ....... *G03G 15/205* (2013.01); *G03G 15/2064* (2013.01); *G03G 15/5004* (2013.01);
(Continued)

(58) Field of Classification Search
USPC ........................................................... 399/69
See application file for complete search history.

(56) References Cited

U.S. PATENT DOCUMENTS

2012/0224878 A1* 9/2012 Ikebuchi ............ G03G 15/2039 399/70
2013/0209123 A1 8/2013 Waida et al.
(Continued)

FOREIGN PATENT DOCUMENTS

JP 2010-286649 A 12/2010
JP 2013-178454 A 9/2013
JP 2021-152598 A 9/2021

*Primary Examiner* — Quana Grainger
(74) *Attorney, Agent, or Firm* — XSENSUS LLP

(57) ABSTRACT

A fixing device includes a first rotator and a second rotator that form a nip therebetween and fix an image on a recording medium that enters the nip. A heater heats at least one of the first rotator or the second rotator. A controller controls the heater to switch between a first heating and a second heating, to switch from the first heating to the second heating before the recording medium enters the nip, to start the second heating at a time prior to a nip entry time at which the recording medium enters the nip by a delay time period taken for the heater to conduct heat to the nip, and to continue the first heating before the second heating for at least one control cycle at a duty cycle of power supplied to the heater. The duty cycle is not greater than 40%.

8 Claims, 10 Drawing Sheets

(52) U.S. Cl.
CPC ............ *G03G 2215/00978* (2013.01); *G03G 2215/2035* (2013.01)

(56) References Cited

U.S. PATENT DOCUMENTS

| | | | |
|---|---|---|---|
| 2021/0223722 | A1 | 7/2021 | Yamashita |
| 2023/0093465 | A1 | 3/2023 | Kabata et al. |
| 2023/0280682 | A1 | 9/2023 | Ryohei et al. |

* cited by examiner

FIXING DEVICE AND IMAGE FORMING APPARATUS WITH A CONTROLLER TO SWITCH BETWEEN A FIRST HEATING AND A SECOND HEATING

CROSS-REFERENCE TO RELATED APPLICATION

This patent application is based on and claims priority pursuant to 35 U.S.C. § 119 (a) to Japanese Patent Application No. 2023-069423, filed on Apr. 20, 2023, in the Japan Patent Office, the entire disclosure of which is hereby incorporated by reference herein.

BACKGROUND

Technical Field

Embodiments of this disclosure relate to a fixing device and an image forming apparatus.

Related Art

Related-art image forming apparatuses, such as copiers, facsimile machines, printers, and multifunction peripherals (MFP) having two or more of copying, printing, scanning, facsimile, plotter, and other functions, typically form an image on a recording medium according to image data.

Such image forming apparatuses employ an electrophotographic method that forms a toner image on a recording medium such as a sheet.

For example, an image forming apparatus employing the electrophotographic method includes a fixing device that fixes a toner image on a recording medium under heat.

The fixing device includes a pair of rotators and a heater. The rotators contact each other to form a nip therebetween. The heater heats at least one of the rotators. As the heater is supplied with power from an alternating current power supply, the heater generates heat, heating the rotator to a target temperature at which the rotator fixes the toner image on the recording medium. As the recording medium enters the nip formed between the rotators, the rotator heats the unfixed toner image on the recording medium, fixing the unfixed toner image on the recording medium.

As the alternating current power supply supplies power to the heater, an alternating current voltage may fluctuate sharply. Accordingly, a fluorescent lamp that shares a power system with the fixing device may flicker.

SUMMARY

This specification describes below an improved fixing device. In one embodiment, the fixing device includes a first rotator and a second rotator that contacts the first rotator to form a nip between the first rotator and the second rotator. The first rotator and the second rotator fix an image on a recording medium that enters the nip under heat. A heater heats at least one of the first rotator or the second rotator. A controller controls the heater to switch between a first heating and a second heating, controls the heater to switch from the first heating to the second heating before the recording medium enters the nip, controls the heater to start the second heating at a time prior to a nip entry time at which the recording medium enters the nip by a delay time period taken for the heater to conduct heat to the nip, and controls the heater to continue the first heating before the second heating for at least one control cycle at a duty cycle of power supplied to the heater. The duty cycle is not greater than 40%.

This specification further describes an improved image forming apparatus. In one embodiment, the image forming apparatus includes an image forming device that forms an image on a recording medium and the fixing device described above that fixes the image on the recording medium.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
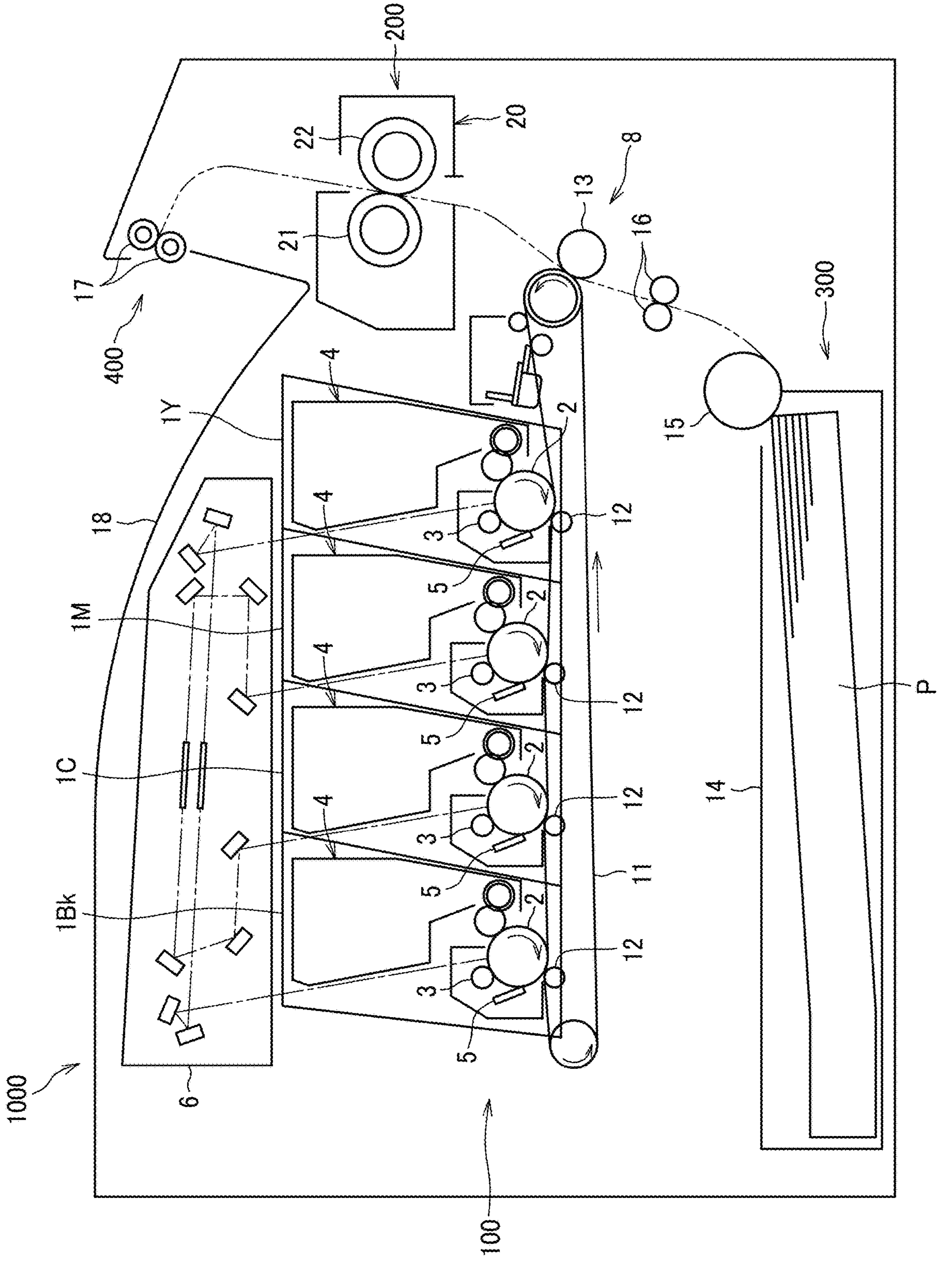
FIG. 1 is a schematic cross-sectional view of an image forming apparatus according to a first embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Referring to the attached drawings, the following describes the embodiments of the present disclosure. In the drawings for explaining the embodiments of the present disclosure, identical reference numerals are assigned to elements such as members and parts that have an identical function or an identical shape as long as differentiation is possible and a description of the elements is omitted once the description is provided.

A description is provided of a first embodiment of the present disclosure.

FIG. 1 is a schematic cross-sectional view of an image forming apparatus 1000 according to the first embodiment of the present disclosure. The image forming apparatus 1000 is a printer. Alternatively, the image forming apparatus 1000 may be a copier, a facsimile machine, a printing machine, a multifunction peripheral (MFP) having at least two of printing, copying, facsimile, scanning, and plotter functions, or the like. Image formation described below denotes forming an image having meaning such as characters and figures and an image not having meaning such as patterns. Referring to FIG. 1, a description is provided of an overall construction and operation of the image forming apparatus 1000 according to the first embodiment of the present disclosure.

A description is provided of the overall construction of the image forming apparatuses 1000.

As illustrated in FIG. 1, the image forming apparatus 1000 according to the first embodiment includes an image forming portion 100, a fixing portion 200, a recording medium supply portion 300, and a recording medium ejecting portion 400. The image forming portion 100, serving as an image forming device, forms a toner image on a sheet P serving as a recording medium. The fixing portion 200 fixes the toner image on the sheet P. The recording medium supply portion 300 supplies the sheet P to the image forming portion 100. The recording medium ejecting portion 400 ejects the sheet Ponto an outside of the image forming apparatus 1000.

A description is provided of a construction of the image forming portion 100.

The image forming portion 100 includes four image forming units 1Y, 1M, 1C, and 1Bk, an exposure device 6, and a transfer device 8. The exposure device 6 forms an electrostatic latent image on a photoconductor 2 of each of the image forming units 1Y, 1M, 1C, and 1Bk. The transfer device 8 transfers the toner image onto the sheet P.

The image forming units 1Y, 1M, 1C, and 1Bk basically have similar constructions, respectively. However, the image forming units 1Y, 1M, 1C, and 1Bk contain toners, serving as developers, in different colors, that is, yellow, magenta, cyan, and black, respectively, which correspond to color separation components for a color image. For example, each of the image forming units 1Y, 1M, 1C, and 1Bk includes the photoconductor 2, a charger 3, a developing device 4, and a cleaner 5. The photoconductor 2 serves as an image bearer that bears an image (e.g., an electrostatic latent image and a toner image) on a surface of the photoconductor 2. The charger 3 charges the surface of the photoconductor 2. The developing device 4 supplies the toner as the developer to the surface of the photoconductor 2 to form a toner image. The cleaner 5 cleans the surface of the photoconductor 2.

The transfer device 8 includes an intermediate transfer belt 11, four primary transfer rollers 12, and a secondary transfer roller 13. The intermediate transfer belt 11 is an endless belt that is stretched taut across a plurality of support rollers. The four primary transfer rollers 12 are disposed within a loop formed by the intermediate transfer belt 11. The primary transfer rollers 12 are pressed against the photoconductors 2, respectively, via the intermediate transfer belt 11, thus forming primary transfer nips between the intermediate transfer belt 11 and the photoconductors 2. The secondary transfer roller 13 contacts an outer circumferential surface of the intermediate transfer belt 11 to form a secondary transfer nip therebetween.

A description is provided of a construction of the fixing portion 200.

The fixing portion 200 includes a fixing device 20 that heats the sheet P, fixing the toner image on the sheet P. The fixing device 20 includes a pair of rotators, that is, a fixing rotator 21 and a pressure rotator 22, that contact each other to form a fixing nip therebetween.

A description is provided of a construction of the recording medium supply portion 300.

The recording medium supply portion 300 includes a sheet tray 14 (e.g., a paper tray) and a feed roller 15. The sheet tray 14 loads a plurality of sheets P serving as recording media. The feed roller 15 picks up and feeds a sheet P from the sheet tray 14. According to the embodiments below, a sheet (e.g., a sheet P) is used as a recording medium. However, the recording medium is not limited to paper as the sheet. In addition to paper as the sheet, the recording media include an overhead projector (OHP) transparency, cloth, a metal sheet, plastic film, and a prepreg sheet pre-impregnated with resin in carbon fibers. In addition to plain paper, the sheets include thick paper, a postcard, an envelope, thin paper, coated paper, art paper, and tracing paper.

A description is provided of a construction of the recording medium ejecting portion 400.

The recording medium ejecting portion 400 includes an output roller pair 17 and an output tray 18. The output roller pair 17 ejects the sheet P onto the outside of the image forming apparatus 1000. The output tray 18 is placed with the sheet P ejected by the output roller pair 17. The image forming apparatus 1000 further includes a timing roller pair 16.

Referring to FIG. 1, a description is provided of image forming processes performed by the image forming apparatus 1000 according to the first embodiment of the present disclosure.

As the image forming apparatus 1000 receives an instruction to start printing, a driver starts driving and rotating the photoconductor 2 of each of the image forming units 1Y, 1M, 1C, and 1Bk and the intermediate transfer belt 11 of the transfer device 8. The feed roller 15 starts rotation, feeding a sheet P from the sheet tray 14. As the sheet P fed by the feed roller 15 comes into contact with the timing roller pair 16, the timing roller pair 16 temporarily halts the sheet P. Thus, the timing roller pair 16 temporarily interrupts conveyance of the sheet P until the toner image, that is to be transferred onto the sheet P, is formed on the intermediate transfer belt 11.

The charger 3 of each of the image forming units 1Y, 1M, 1C, and 1Bk charges the surface of the photoconductor 2 evenly at a high electric potential. The exposure device 6 exposes the charged surfaces of the photoconductors 2, respectively, according to image data (e.g., print data) sent from a terminal. Alternatively, if the image forming apparatus 1000 is a copier, the exposure device 6 exposes the charged surfaces of the photoconductors 2, respectively, according to image data created by a scanner that reads an image on an original. Accordingly, the electric potential of an exposed portion on the surface of each of the photoconductors 2 decreases, forming an electrostatic latent image on the surface of each of the photoconductors 2. The developing device 4 of each of the image forming units 1Y, 1M, 1C, and 1Bk supplies toner to the electrostatic latent image formed on the photoconductor 2, forming a toner image thereon. When the toner images formed on the photoconductors 2 reach the primary transfer nips defined by the primary transfer rollers 12 in accordance with rotation of the photoconductors 2, respectively, the primary transfer rollers 12 transfer the toner images formed on the photoconductors 2 onto the intermediate transfer belt 11 driven and rotated counterclockwise in FIG. 1 successively such that the toner images are superimposed on the intermediate transfer belt 11. Thus, the superimposed toner images form a full color toner image on the intermediate transfer belt 11. Alternatively, one of the four image forming units 1Y, 1M, 1C, and 1Bk may be used to form a monochrome toner image or two or three of the four image forming units 1Y, 1M, 1C, and 1Bk may be used to form a bicolor toner image or a tricolor toner image. After the toner image formed on the photoconductor 2 is transferred onto the intermediate transfer belt 11, the cleaner 5 removes residual toner and the like remaining on the photoconductor 2 therefrom.

The full color toner image formed on the intermediate transfer belt 11 is conveyed to the secondary transfer nip defined by the secondary transfer roller 13 in accordance with rotation of the intermediate transfer belt 11 and is transferred onto the sheet P conveyed by the timing roller pair 16. The sheet P transferred with the full color toner image is conveyed to the fixing device 20. As the sheet P passes through the fixing nip formed between the fixing rotator 21 and the pressure rotator 22 that contact each other, the fixing rotator 21 and the pressure rotator 22 fix the full color toner image on the sheet P under heat and pressure. The sheet P is conveyed to the recording medium ejecting portion 400 where the output roller pair 17 ejects the sheet P onto the output tray 18. Thus, a series of image forming processes is finished.

Figure 2:
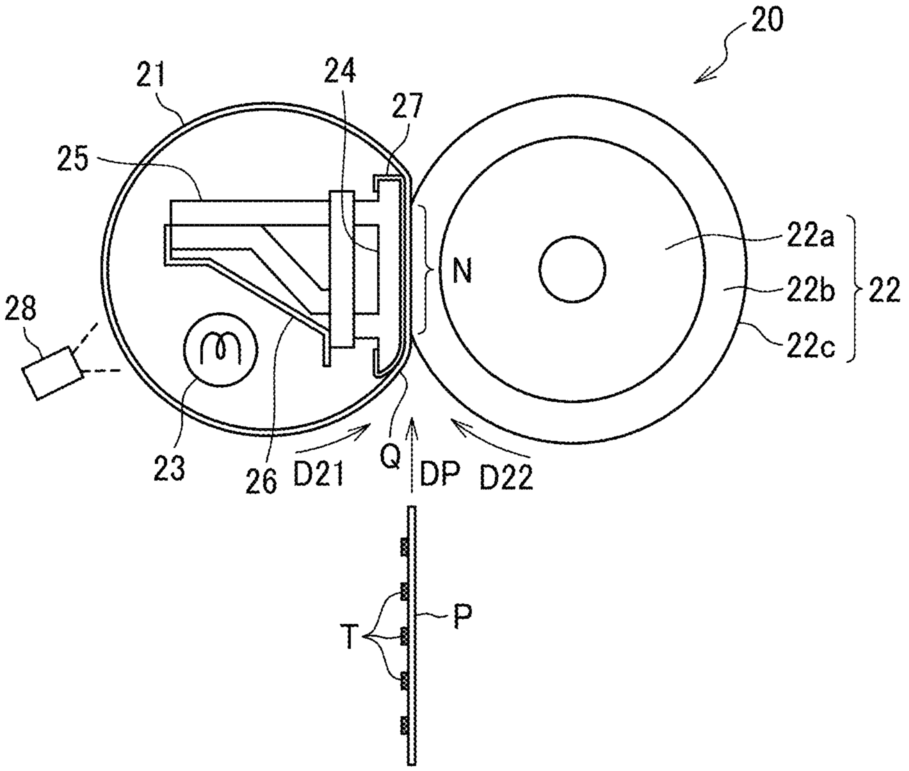
FIG. 2 is a schematic cross-sectional view of a fixing device incorporated in the image forming apparatus depicted in FIG. 1.

Referring to FIG. 2, a description is provided of a construction of the fixing device 20 according to the first embodiment of the present disclosure.

As illustrated in FIG. 2, in addition to the pair of rotators, that is, the fixing rotator 21 and the pressure rotator 22, the fixing device 20 according to the embodiment includes a heater 23, a nip formation pad 24, a support 25, a reflector 26, a slide aid 27, and a temperature detector 28.

The fixing rotator 21 is one of the rotators and serves as a first rotator. The fixing rotator 21 contacts an unfixed toner image bearing side of the sheet P, that bears an unfixed toner image T (e.g., unfixed toner), and fixes the unfixed toner image T on the sheet P. The pressure rotator 22 is another one of the rotators and serves as a second rotator. The pressure rotator 22 contacts the fixing rotator 21 to form a fixing nip N between the fixing rotator 21 and the pressure rotator 22.

According to the embodiment, the fixing rotator 21 is an endless belt (e.g., a fixing belt) that has flexibility. The pressure rotator 22 is a roller (e.g., a pressure roller) that includes an elastic layer. The fixing rotator 21 may be a roller instead of the belt. The pressure rotator 22 may be a belt instead of the roller.

For example, the fixing rotator 21 is the belt having an outer diameter of 30 mm and a length of 360 mm in a longitudinal direction of the fixing rotator 21. The fixing rotator 21 includes an inner coating layer as an innermost layer, a base layer, a thermal conduction layer, an elastic layer, and a release layer as an outermost layer. The inner coating layer has a thickness of 10 μm, for example. The base layer is made of nickel and has a thickness of 30 μm, for example. The thermal conduction layer is made of copper and has a thickness of 10 μm, for example. The elastic layer is made of silicone rubber and has a thickness of 120 μm, for example. The release layer is made of perfluoroalkoxy alkane (PFA) and has a thickness of 7 μm, for example.

For example, the pressure rotator 22 is the roller having an outer diameter of 32 mm and a length of 340 mm in a longitudinal direction of the pressure rotator 22. The pressure rotator 22 includes a core 22*a* (e.g., a core metal) as an innermost layer, an elastic layer 22*b*, and a release layer 22*c* as an outermost layer. For example, the core 22*a* is made of iron and has an outer diameter of 24 mm. The core 22*a* is solid or hollow. The elastic layer 22*b* is made of foam rubber and has a thickness of 4 mm, for example. The release layer 22*c* is made of PFA and has a thickness of 50 μm, for example.

The heater 23 radiates thermal energy including an electromagnetic wave such as infrared light onto a target object, thus heating the target object without contacting the target object. According to the embodiment, the heater 23 is a halogen heater that emits infrared light onto the target object, heating the target object. The halogen heater is disposed within a loop formed by the fixing rotator 21. The halogen heater emits infrared light that irradiates an inner circumferential face of the fixing rotator 21, thus heating the fixing rotator 21 on the inner circumferential face thereof. Alternatively, the heater 23 may heat the pressure rotator 22 instead of the fixing rotator 21.

The nip formation pad 24 is disposed within the loop formed by the fixing rotator 21. The nip formation pad 24 and the pressure rotator 22 sandwich the fixing rotator 21 and define the fixing nip N between the fixing rotator 21 and the pressure rotator 22. The nip formation pad 24 is made of heat-resistant resin, for example. The nip formation pad 24 presses against an outer circumferential face of the pressure rotator 22 via the fixing rotator 21, forming the fixing nip N between the fixing rotator 21 and the pressure rotator 22.

The support 25 supports the nip formation pad 24. The support 25 supports an opposite face of the nip formation pad 24, that is opposite to a fixing nip opposed face of the nip formation pad 24, that is disposed opposite the fixing rotator 21 and the fixing nip N. Hence, the support 25 receives pressure from the pressure rotator 22, suppressing a bend of the nip formation pad 24. Thus, the support 25 causes the nip formation pad 24 to form the fixing nip N that has an even width in a sheet conveyance direction DP throughout an entire span of the fixing rotator 21 in the longitudinal direction thereof. According to the embodiment, the fixing nip N includes a center portion and both lateral end portions in the longitudinal direction of the fixing rotator 21. The center portion has a width of 10 mm in the sheet conveyance direction DP. Each of the lateral end portions has a width of 10.5 mm in the sheet conveyance direction DP. The fixing nip N is applied with pressure of 25 kgf, for example.

The reflector 26 reflects thermal energy radiated from the heater 23 toward the fixing rotator 21. As the heater 23 radiates thermal energy, the reflector 26 reflects the thermal energy toward the fixing rotator 21, facilitating heating of the fixing rotator 21. According to the embodiment, the reflector 26 is interposed between the heater 23 and the support 25, preventing the heater 23 from supplying redundant thermal energy to the support 25.

The slide aid 27 is interposed between the nip formation pad 24 and the fixing rotator 21 and is made of a low friction material. The slide aid 27 is made of polytetrafluoroethylene (PTFE) or the like, for example. Since the slide aid 27 is interposed between the nip formation pad 24 and the fixing rotator 21, the slide aid 27 decreases sliding friction that generates between the nip formation pad 24 and the fixing rotator 21 that slides over the nip formation pad 24.

The temperature detector 28 detects a temperature of the fixing rotator 21. For example, the temperature detector 28 is disposed opposite an outer circumferential face of the fixing rotator 21 in a center portion of the fixing rotator 21 in the longitudinal direction thereof. For example, general temperature sensors such as a thermopile, a thermostat, a thermistor, and a normally closed (NC) sensor are used as the temperature detector 28. The temperature detector 28 is a non-contact type temperature sensor that does not contact the outer circumferential face of the fixing rotator 21. Alternatively, the temperature detector 28 may be a contact type temperature sensor that contacts the fixing rotator 21.

A description is provided of operation of the fixing device 20 according to the embodiment.

Figure 3:
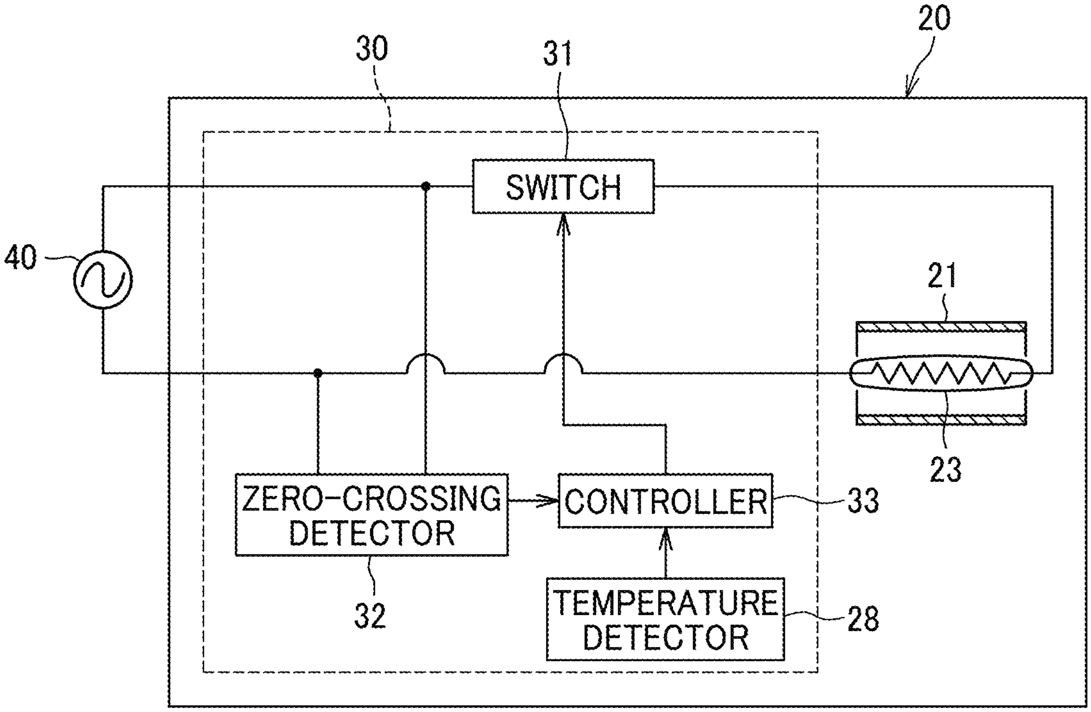
FIG. 3 is a block diagram of a heating control device incorporated in the fixing device depicted in FIG. 2.

As the image forming apparatus 1000 starts a print job, a driver starts driving and rotating the pressure rotator 22 clockwise in FIG. 2 in a rotation direction D22. The pressure rotator 22 drives and rotates the fixing rotator 21 in a rotation direction D21. The heater 23 starts generating heat, heating the fixing rotator 21. As illustrated in FIG. 3, the fixing device 20 further includes a controller 33. The controller 33 controls the heater 23 based on a temperature of the fixing rotator 21, that is detected by the temperature detector 28, thus retaining the temperature of the fixing rotator 21 at a predetermined fixing temperature at which the fixing rotator 21 fixes the toner image T on the sheet P. Thereafter, the sheet P bearing the unfixed toner image T is conveyed to the fixing device 20. As the sheet P enters the fixing nip N formed between the fixing rotator 21 and the pressure rotator 22, the fixing rotator 21 and the pressure rotator 22 heat and press the sheet P and the unfixed toner image T on the sheet P, fixing the unfixed toner image T on the sheet P.

A description is provided of a configuration of a comparative fixing device that suppresses generation of flickers.

The comparative fixing device employs a half-wave control and a phase control as a control method for controlling a heater of the comparative fixing device.

However, the control method of the comparative fixing device may not suppress generation of flickers while improving fixing of a toner image on a sheet.

A description is provided of disadvantages of a temperature control of the comparative fixing device for controlling a temperature of a fixing rotator.

As the temperature control, the comparative fixing device performs a feedback control that controls heat generation of the heater based on a temperature of the fixing rotator, that is detected by a temperature detector. For example, the comparative fixing device includes a controller that calculates a duty cycle at which the heater is supplied with power based on the detected temperature. The controller controls power supplied to the heater based on the calculated duty cycle. The duty cycle (e.g., a duty cycle D) denotes a rate of an energization time W per control cycle C for energizing the heater (D=W/C). The duty cycle is also called a duty. The controller controls the heater under the feedback control based on the duty cycle calculated based on the detected temperature, thus retaining the temperature of the fixing rotator at a predetermined fixing temperature at which the fixing rotator fixes a toner image on a sheet.

However, when the sheet enters a fixing nip formed between the fixing rotator and a pressure rotator, the sheet may draw heat from the fixing rotator and the pressure rotator, causing temperature decrease of the fixing rotator at the fixing nip. For example, if the fixing rotator is a belt that has a thermal capacity smaller than a thermal capacity of a roller, the belt may suffer from substantial temperature decrease at the fixing nip when the sheet enters the fixing nip.

Hence, in order to prevent temperature decrease of the fixing rotator at the fixing nip, the comparative fixing device performs a feedforward control that supplies a predetermined amount of power to the heater at a predetermined time before the sheet enters the fixing nip.

Referring to FIGS. 16, 17, 18, 19A, and 19B, a description is provided of the feedforward control.

Figure 16:
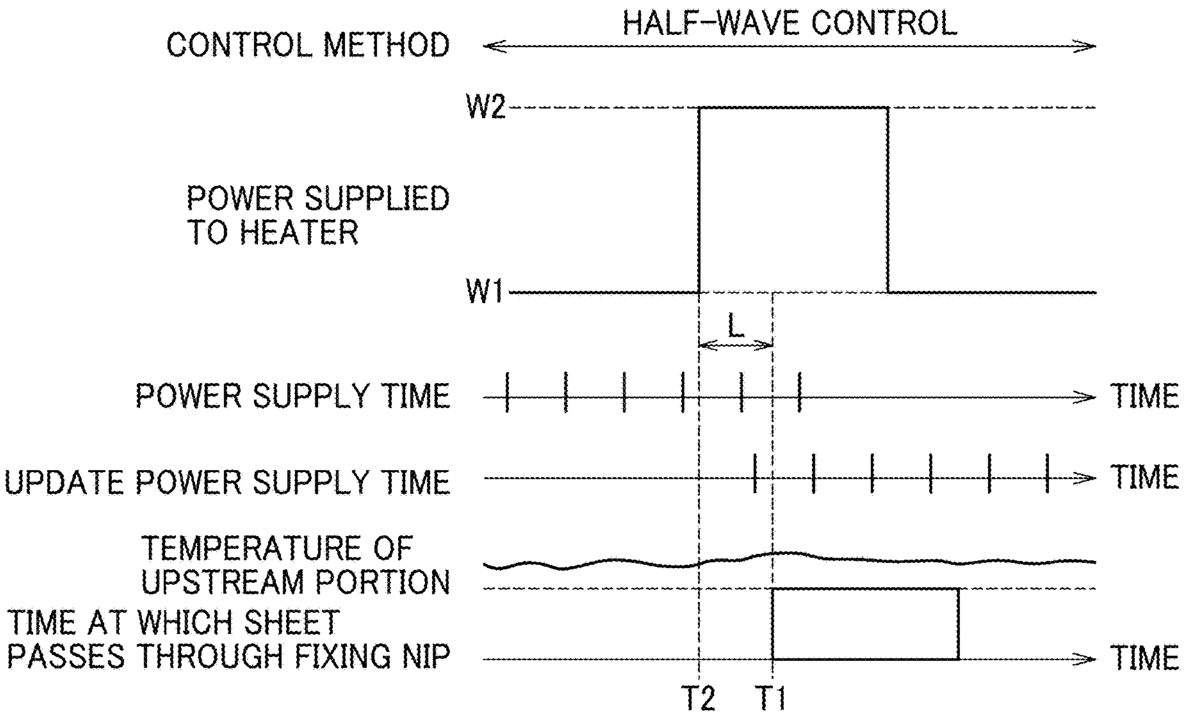
FIG. 16 is a timing chart as one example of a feedforward control that supplies a predetermined amount of power before a sheet enters the fixing nip.

FIG. 16 is a timing chart of the feedforward control as one example.

As illustrated in FIG. 16, at a time T2 that is prior to a nip entry time T1 at which a leading end of the sheet enters the fixing nip by a predetermined time period, that is, a delay time period L, the feedforward control supplies predetermined power W2 (e.g., a predetermined amount of power) to the heater. The predetermined time period, that is, the delay time period L, is from a time when the heater is supplied with power until heat generated by the heater is conducted to the fixing nip. Hence, the controller resets a start of a control cycle for supplying the predetermined power W2 to the heater to the time T2 that is prior to the nip entry time T1 at which the leading end of the sheet enters the fixing nip by the delay time period L. Thus, the controller starts supplying the predetermined power W2 to the heater at the time T2 that is prior to the nip entry time T1 by the delay time period L. Accordingly, heat in a proper amount is conducted to the sheet at the nip entry time T1, suppressing temperature decrease of the fixing rotator in response to the leading end of the sheet that enters the fixing nip.

Figure 19A:
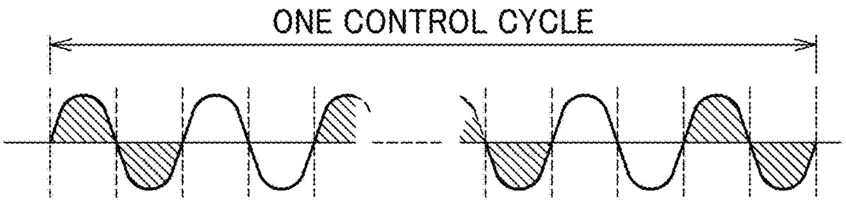
FIG. 19A is a diagram illustrating a half-wave control method.

FIG. 16 illustrates the half-wave control as a control method that controls the heater. As illustrated in FIG. 19A, the half-wave control (e.g., a half-wave controlled rectifier) is the control method that supplies power to the heater per half wave shaded in FIG. 19A (e.g., one-half of an alternating current cycle) of an alternating current from an alternating current power supply. Under the half-wave control, the controller supplies the predetermined power W2 to the heater at the time T2 that is prior to the nip entry time T1. However, when the comparative fixing device is in a heated state in which the comparative fixing device stores heat sufficiently, the controller may supply power in a decreased amount. Accordingly, an amount of power supplied to the heater may be below a power threshold Wh, degrading or breaking a filament of a halogen heater serving as the heater. Hence, when the comparative fixing device is in the heated state, in view of preventing degradation and breakage of the heater, in order to prevent the heater from being supplied with the amount of power that is below the power threshold Wh, the controller controls the duty cycle not greater than a predetermined value to zero. However, after the duty cycle is zero, when the alternating current power supply supplies the predetermined power W2 to the heater, the amount of power may change sharply, generating flickers.

Figure 17:
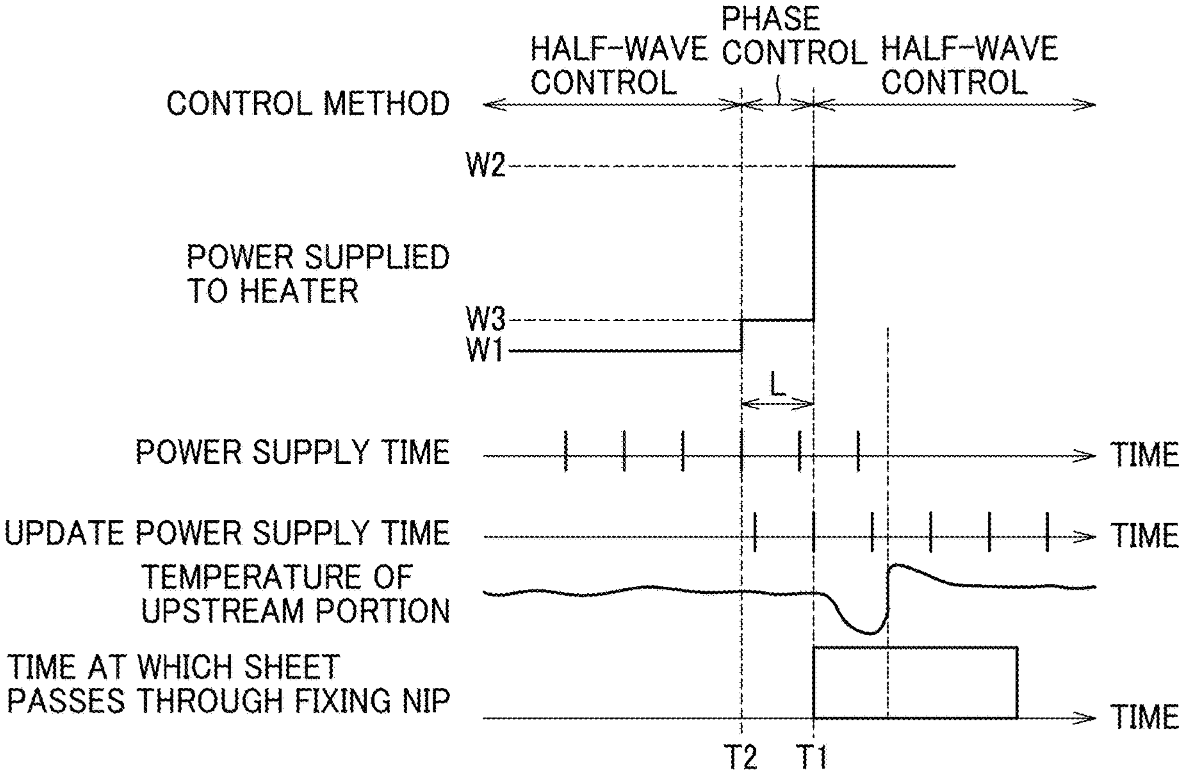
FIG. 17 is a timing chart illustrating a temperature control while a sheet is conveyed through a comparative fixing device that is heated.
Figure 19B:
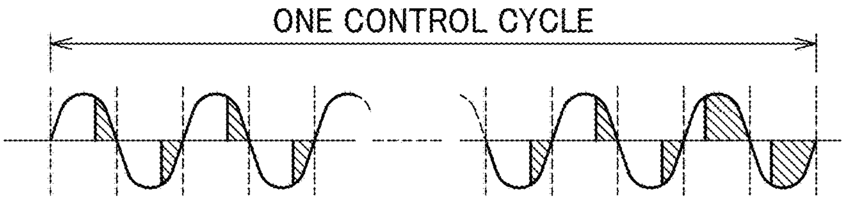
FIG. 19B is a diagram illustrating a phase control method.

In order to suppress flickers, as illustrated in FIG. 17, the comparative fixing device may employ the phase control, that is different from the half-wave control, to supply power to the heater. As illustrated in FIG. 19B, the phase control (e.g., a phase-controlled rectifier) is the control method that supplies power to the heater per predetermined phase angle shaded in FIG. 19B of one half wave (e.g., one-half of the alternating current cycle) of the alternating current from the alternating current power supply.

Under the phase control, the controller starts supplying power to the heater at a slight duty cycle. Hence, the controller disperses a rate of supply and interruption of power within one control cycle, suppressing flickers. However, slight power W3 depicted in FIG. 17 supplied before the sheet enters the fixing nip is smaller than the predetermined power W2. Accordingly, temperature decrease may occur at the fixing nip, resulting in faulty fixing such as degradation of gloss of the toner image formed on the sheet.

Figure 18:
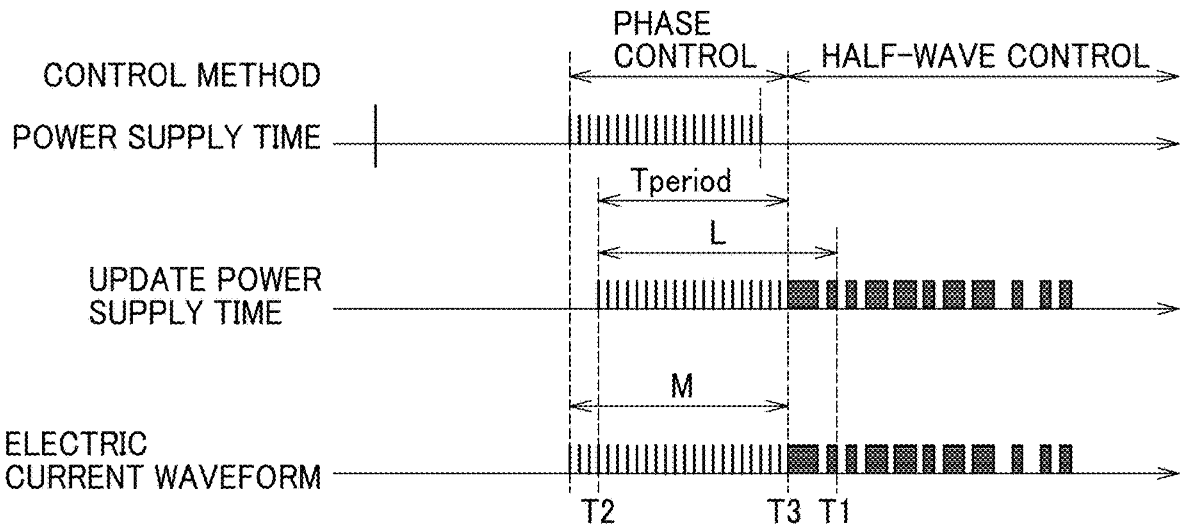
FIG. 18 is a timing chart illustrating a comparative phase control and a comparative half-wave control.

As illustrated in FIG. 18, if the controller resets the control cycle during the phase control, the controller suppresses flickers effectively. Hence, the phase control continues for a time period M that is not shorter than one control cycle Tperiod. For example, the one control cycle Tperiod defines 200 msec of 20 half waves at 50 Hz. After the controller starts the phase control, if the controller resets the control cycle for one half wave, the controller suppresses flickers insufficiently. Hence, the phase control continues for another control cycle Tperiod. However, the controller starts supplying power to the heater under the half-wave control at a power supply start time T3 that is delayed from the time T2 that is prior to the nip entry time T1 by the delay time period L. Accordingly, heat in the proper amount is not conducted to the sheet at the nip entry time T1, causing temperature decrease at the fixing nip. For example, since the comparative fixing device is installed in an image forming apparatus that prints at a high speed, the comparative fixing device consumes an increased amount of heat per unit time. Additionally, as the power supply start time T3 is delayed, heat conduction to the sheet may be delayed substantially from the leading end of the sheet. Accordingly, the comparative fixing device in the heated state may suffer from substantial temperature decrease.

To address the circumstance, the fixing device 20 according to the first embodiment of the present disclosure employs a construction and a temperature control method described below that suppress flickers and improve fixing of the toner image T on the sheet P. The following describes the construction and the temperature control method according to embodiments of the present disclosure.

A description is provided of a construction of a heating control device 30 incorporated in the fixing device 20.

FIG. 3 is a block diagram of the heating control device 30 according to the first embodiment of the present disclosure.

As illustrated in FIG. 3, the heating control device 30 according to the first embodiment of the present disclosure includes the temperature detector 28, a switch 31, a zero-crossing detector 32, the controller 33, and an alternating current power supply 40. The heating control device 30 may be located inside the fixing device 20 or an apparatus body of the image forming apparatus 1000.

The switch 31 switches between supply and interruption of power from the alternating current power supply 40 to the heater 23 according to an instruction from the controller 33. When the switch 31 is turned on, the switch 31 starts supplying power from the alternating current power supply 40 to the heater 23, causing the heater 23 to generate heat. Conversely, when the switch 31 is turned off, the switch 31 interrupts supplying power from the alternating current power supply 40 to the heater 23, causing the heater 23 to interrupt generation of heat.

The zero-crossing detector 32 detects a zero-crossing time of the alternating current power supply 40. For example, the zero-crossing detector 32 detects a zero-crossing time at which an alternating current (AC) voltage applied from the alternating current power supply 40 changes from a positive voltage to a negative voltage and a zero-crossing time at which the alternating current voltage changes from a negative voltage to a positive voltage. When the zero-crossing detector 32 detects the zero-crossing time, the zero-crossing detector 32 outputs a zero-crossing detection signal to the controller 33.

Based on a temperature of the outer circumferential face of the fixing rotator 21, that is detected by the temperature detector 28, and a zero-crossing time of the alternating current voltage, that is detected by the zero-crossing detector 32, the controller 33 determines a time at which the switch 31 switches the alternating current voltage. The controller 33 controls the switch 31 based on the determined time. For example, according to the embodiment, the controller 33 performs the phase control and the half-wave control. Under the phase control, the controller 33 controls the switch 31 to supply power to the heater 23 at a predetermined phase angle of one half wave (e.g., one-half of an alternating current cycle) of the alternating current generated by the alternating current power supply 40 based on the zero-crossing time. Under the half-wave control, the controller 33 controls the switch 31 to supply power fully or interrupt power supply to the heater 23 per one half wave of the alternating current generated by the alternating current power supply 40 based on the zero-crossing time. The controller 33 switches between the phase control serving as a first heating and the half-wave control serving as a second heating.

For example, the controller 33 is hardware equivalent to an information processing apparatus installed as a computer in which a central processing unit (CPU), a random access memory (RAM), a read only memory (ROM), and an input-output interface are connected through a bus. The controller 33 defines a function block created by the CPU as a hardware resource that reads and executes a program stored in the ROM.

A description is provided of the temperature control method according to the first embodiment of the present disclosure.

Figure 4:
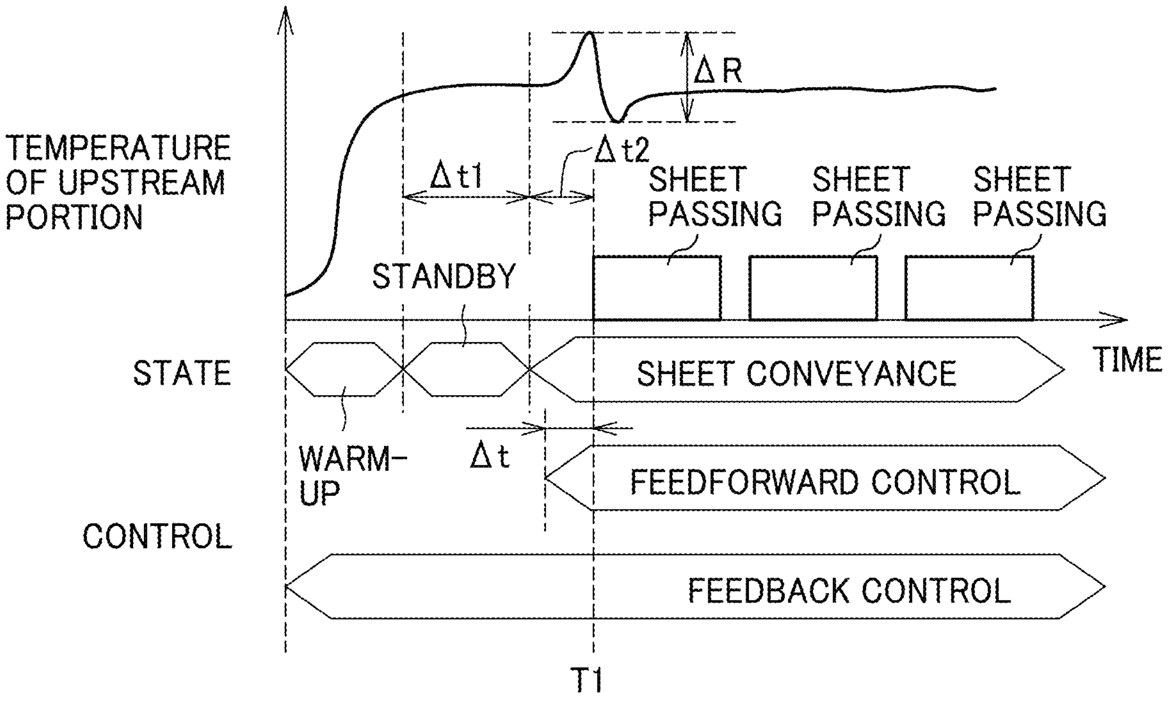
FIG. 4 is a timing chart illustrating conveyance of sheets through the fixing device depicted in FIG. 2 and a temperature control of the fixing device according to the first embodiment of the present disclosure.

As illustrated in FIG. 4, according to the embodiment, immediately after the image forming apparatus 1000 is powered on, the fixing device 20 is warmed up. In order to warm up the fixing device 20, the controller 33 starts supplying power to the heater 23 so that the heater 23 heats the fixing rotator 21. Accordingly, a temperature of an upstream portion Q of the fixing rotator 21 depicted in FIG. 2 increases gradually. FIG. 4 illustrates the temperature of the upstream portion Q of the fixing rotator 21, that is disposed upstream from the fixing nip N in the sheet conveyance direction DP or the rotation direction D21 of the fixing rotator 21.

In order to control the heater 23 to warm up the fixing device 20, the controller 33 performs the feedback control that determines a time for supplying power to the heater 23 based on a temperature of the fixing rotator 21, that is detected by the temperature detector 28. When the heater 23 heats the fixing rotator 21 to the predetermined fixing temperature, the controller 33 finishes warming up the fixing device 20 and the fixing device 20 enters a standby state (e.g., a standby mode). The standby state continues for a predetermined time period Δt1. After the time period Δt1 elapses, the controller 33 starts conveying a sheet P. Accordingly, the feed roller 15 picks up the sheet P from the sheet tray 14. The timing roller pair 16 conveys the sheet P to the secondary transfer nip where a toner image T is transferred onto the sheet P. The sheet P transferred with the toner image T is conveyed to the fixing device 20 that fixes the toner image T on the sheet P. FIG. 4 illustrates a predetermined time period Δt2 from a time when the controller 33 starts conveying a first sheet P until the first sheet P enters the fixing nip N of the fixing device 20. For example, when the predetermined time period Δt2 elapses from the time when the controller 33 starts conveying the first sheet P, the first sheet P enters the fixing nip N of the fixing device 20 and the fixing device 20 fixes a toner image T on the first sheet P. Thereafter, a second sheet P and one or more following sheets P enter the fixing nip N with a predetermined interval therebetween. Similarly, the fixing device 20 fixes the toner images T on the second sheet P and the following sheets P, respectively.

According to the embodiment, in addition to the feedback control, in order to suppress temperature decrease of the fixing rotator 21 when the sheet P enters the fixing nip N, the controller 33 performs the feedforward control that supplies the predetermined amount of power to the heater 23 before the sheet P enters the fixing nip N. For example, at a time that is prior to the nip entry time T1 at which a leading end of the first sheet P enters the fixing nip N by a predetermined time period Δt, the controller 33 performs the feedforward control that supplies the predetermined amount of power to the heater 23. Before the fixing device 20 is in the heated state in which the fixing device 20 stores a predetermined amount of heat, the fixing device 20 is in a cool state in which the fixing device 20 stores heat in a decreased amount that is smaller than the predetermined amount of heat. While the fixing device 20 is in the cool state, the controller 33 performs the half-wave control, serving as the second heating, as the feedforward control and the feedback control. For example, the controller 33 performs the feedforward control by using a fixed duty cycle, changing a level of a start time to start the feedforward control, and comparing a profile of a temperature of the upstream portion Q of the fixing rotator 21, that is disposed upstream from the fixing nip N in the sheet conveyance direction DP. Conversely, the controller 33 performs the feedback control by using a proportional-integral-differential controller (PID). The controller 33 determines a final duty cycle by calculating a total of a duty cycle of the feedforward control and a duty cycle of the feedback control. However, if the total of the duty cycles exceeds 100%, the controller 33 determines the final duty cycle of 100%.

Figure 5:
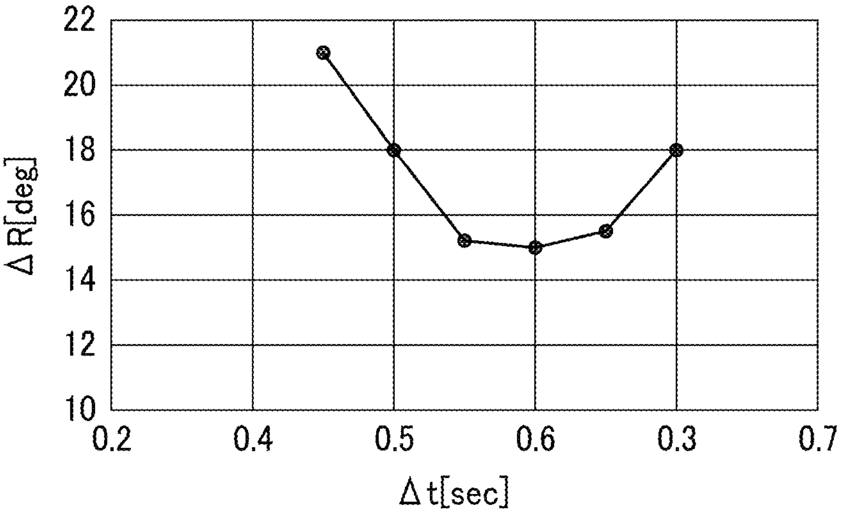
FIG. 5 is a graph illustrating a relation between a start time at which the fixing device depicted in FIG. 2 starts a feedforward control and a temperature ripple at an upstream portion of a fixing belt of the fixing device, that is disposed upstream from a fixing nip formed between the fixing belt and a pressure roller.

FIG. 5 is a graph illustrating a relation between a start time at which the controller 33 starts the feedforward control and a temperature ripple (e.g., a temperature difference) in the upstream portion Q of the fixing rotator 21.

In FIG. 5, a horizontal axis represents the time period Δt taken after the feedforward control supplies the predetermined amount of power to the heater 23 until the first sheet P enters the fixing nip N. That is, the horizontal axis represents the start time of the feedforward control. A vertical axis represents a temperature ripple ΔR of the temperature of the upstream portion Q of the fixing rotator 21. When the time period Δt is 0.5 sec, the temperature ripple ΔR is smallest. Hence, the time period Δt of 0.5 sec is equivalent to the delay time period L taken from a time when the heater 23 is supplied with power until heat generated by the heater 23 is conducted to the fixing nip N.

Figure 6A:
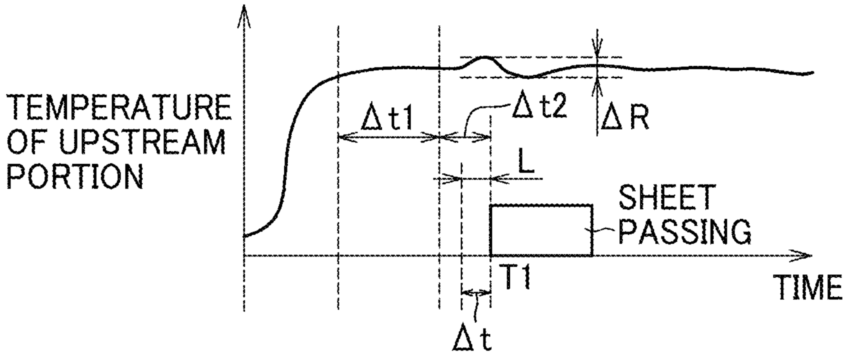
FIG. 6A is a graph illustrating one example of change of the temperature ripple that varies depending on the start time of the feedforward control.
Figure 6B:
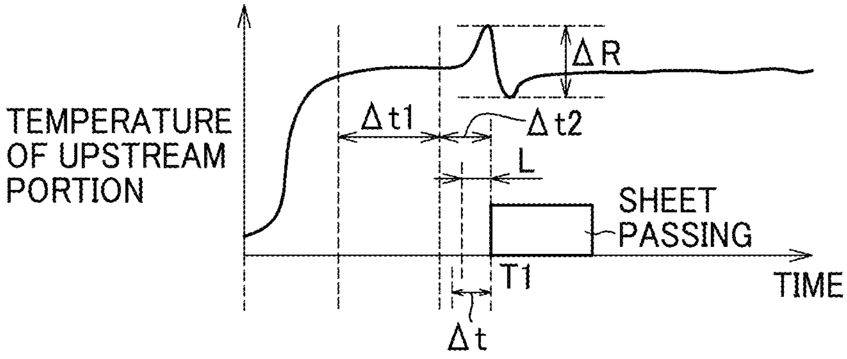
FIG. 6B is a graph illustrating another example of change of the temperature ripple that varies depending on the start time of the feedforward control.
Figure 6C:
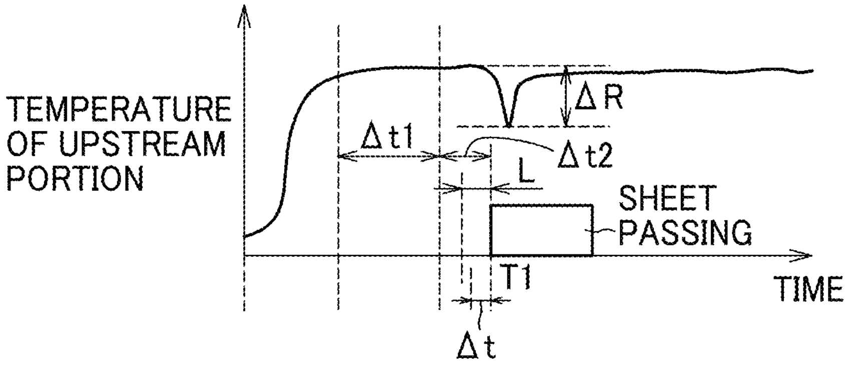
FIG. 6C is a graph illustrating yet another example of change of the temperature ripple that varies depending on the start time of the feedforward control.

Accordingly, as illustrated in FIG. 6A, in a case that the controller 33 starts the feedforward control at a time prior to the nip entry time T1 by the delay time period L, that is, the optimal time period Δt of 0.5 sec (Δt=L), the heater 23 conducts the predetermined amount of heat to the fixing rotator 21 when the sheet P enters the fixing nip N, minimizing the temperature ripple ΔR. Conversely, as illustrated in FIG. 6B, in a case that the controller 33 starts the feedforward control at a time earlier than the time prior to the nip entry time T1 by the delay time period L that is shorter than the time period Δt (Δt>L), the heater 23 conducts the predetermined amount of heat to the fixing rotator 21 before the sheet P enters the fixing nip N. Hence, the temperature of the upstream portion Q of the fixing rotator 21 increases, thus increasing the temperature ripple ΔR. As illustrated in FIG. 6C, in a case that the controller 33 starts the feedforward control at a time later than the time prior to the nip entry time T1 by the delay time period L that is longer than the time period Δt (Δt<L), the heater 23 conducts the predetermined amount of heat to the fixing rotator 21 after the sheet P enters the fixing nip N. Hence, the temperature of the upstream portion Q of the fixing rotator 21 decreases, thus increasing the temperature ripple ΔR (e.g., temperature decrease). To address the circumstances, according to the embodiment, the time period Δt taken from the start time when the controller 33 starts the feedforward control until the first sheet P enters the fixing nip N is equivalent to the delay time period L of 0.5 sec.

As described above, the feedforward control starts supplying power to the heater 23 at the time that is prior to the nip entry time T1 of the first sheet P by the delay time period L, thus suppressing temperature decrease of the fixing rotator 21 after the first sheet P enters the fixing nip N. However, while the fixing device 20 is in the heated state in which the fixing device 20 stores heat sufficiently, if the controller 33 performs the half-wave control to supply power to the heater 23, flickers may occur. Conversely, in order to suppress flickers, if the controller 33 switches from the half-wave control to the phase control, temperature decrease of the fixing rotator 21 may occur, resulting in faulty fixing such as degradation of gloss of the toner image T formed on the sheet P.

To address the circumstances, even if the fixing device 20 according to the first embodiment of the present disclosure is in the heated state, the controller 33 performs a temperature control of the fixing rotator 21 as described below to improve fixing of the toner image T on the sheet P while suppressing flickers.

Figure 7:
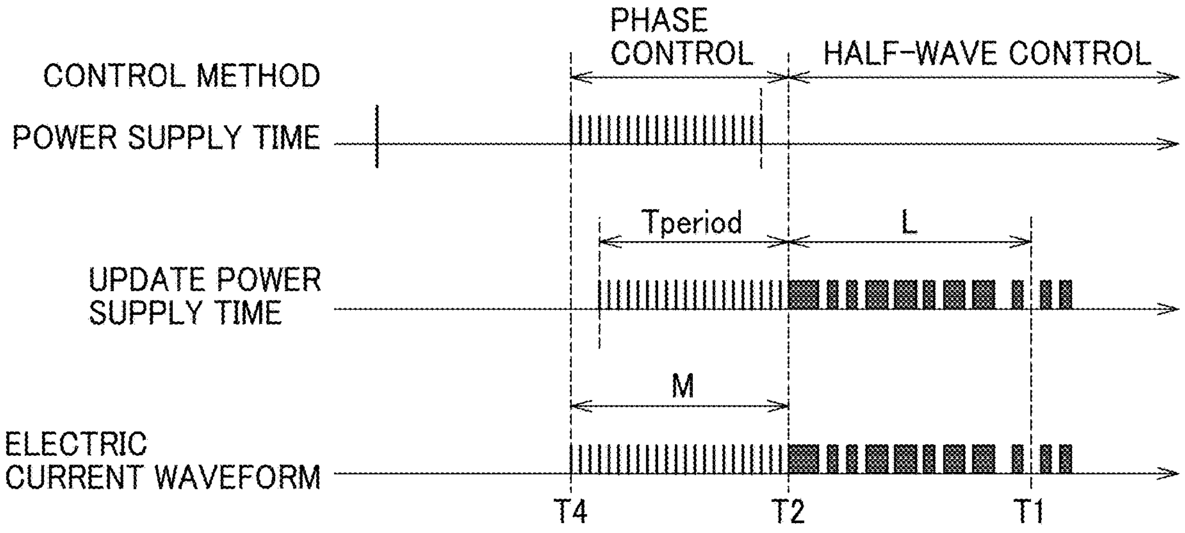
FIG. 7 is a timing chart illustrating the temperature control according to the first embodiment of the present disclosure while the fixing device is heated.

FIG. 7 is a timing chart of the temperature control according to the first embodiment of the present disclosure while the fixing device 20 is in the heated state.

As illustrated in FIG. 7, the controller 33 according to the first embodiment of the present disclosure starts supplying power to the heater 23 under the phase control at a time T4 that is prior to the time T2 by the one control cycle Tperiod or longer. The time T2 is prior to the nip entry time T1 of the first sheet P by the delay time period L. After the controller 33 continues supplying power to the heater 23 under the phase control for the time period M that is not shorter than the one control cycle Tperiod, the controller 33 starts supplying power to the heater 23 under the half-wave control at the time T2 that is prior to the nip entry time T1 of the first sheet P by the delay time period L.

As described above, the controller 33 starts the half-wave control at the time T2 that is prior to the nip entry time T1 of the first sheet P by the delay time period L. Hence, under the half-wave control, the controller 33 supplies the predetermined amount of power to the heater 23 at a proper time, that is, the time T2. Additionally, the controller 33 starts supplying power to the heater 23 under the phase control at the time T4 that is prior to the time T2 by the one control cycle Tperiod or longer. The time T2 is prior to the nip entry time T1 of the first sheet P by the delay time period L. Hence, the controller 33 continues supplying power to the heater 23 under the phase control for the one control cycle Tperiod or longer before the half-wave control. Accordingly, while the controller 33 suppresses flickers effectively, the controller 33 supplies the predetermined amount of power to the heater 23 at the proper time, suppressing temperature decrease of the fixing rotator 21 and improving fixing of the toner image T on the sheet P. Consequently, according to the first embodiment of the present disclosure, the controller 33 achieves both suppressing flickers and improving fixing of the toner image T on the sheet P.

A description is provided of a second embodiment of the present disclosure.

Figure 8:
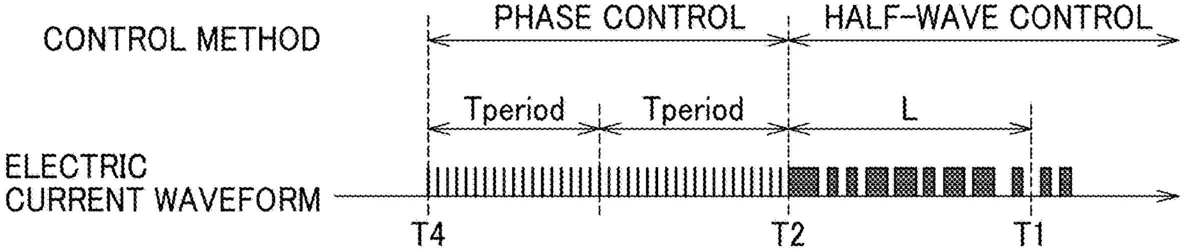
FIG. 8 is a timing chart illustrating the temperature control according to a second embodiment of the present disclosure.

As illustrated in FIG. 8, the controller 33 continues the phase control for a time period that is twice as long as the one control cycle Tperiod. For example, immediately before the half-wave control, the controller 33 starts the phase control at the time T4 that is prior to the time T2 by the time period that is twice as long as the one control cycle Tperiod. The time T2 is prior to the nip entry time T1 of the sheet P by the delay time period L. Alternatively, instead of the time T4, at which the controller 33 starts the phase control, that is prior to the time T2 by the time period that is twice as long as the one control cycle Tperiod, the time T4 may be prior to the time T2 by a time period that is defined by an arbitrary integral multiple, such as three or four times, of the one control cycle Tperiod.

A description is provided of comparison tests.

In order to confirm advantages of the embodiments of the present disclosure, the comparison tests were performed as described below. In the comparison tests, embodiments of the present disclosure and comparative examples were prepared and glossiness of a toner image formed according to each of the embodiments of the present disclosure and the comparative examples was measured.

A description is provided of the comparison test with an embodiment 1 of the present disclosure and a comparative example 1.

The embodiment 1 and the comparative example 1 employed different temperature control methods, respectively. However, the embodiment 1 and the comparative example 1 used fixing devices having an identical construction, respectively. Sheets were conveyed through the fixing devices under an identical condition to fix toner images on the sheets, respectively. For example, the fixing devices having the construction of the fixing device 20 depicted in FIG. 2 were used. Plain paper having a letter size (e.g., standard paper having a paper weight of 20 lb) was used as the sheets and fed in landscape orientation through the fixing devices at a linear velocity of 300 m/sec or 60 copies per minute (CPM). From the cool state of each of the fixing devices, the sheets for 30 jobs were conveyed with an interval of 20 seconds for 3 sheets. The toner image formed on the sheet was a red patch image having a length of 50 mm in portrait orientation and a length of 50 mm in landscape orientation. In order to fix the red patch image on the sheet while a fixing belt serving as a fixing rotator and having a diameter of 30 mm rotated for one rotation, the red patch image was transferred onto the sheet in an area that was on a center on the sheet in a width direction thereof and created a margin of 20 mm from a leading edge of the sheet in a sheet conveyance direction. The red patch image was adhered with toner in an amount defined by mass per unit area (M/A) of 0.8 mg/cm$^2$ (M/A=0.8 mg/cm$^2$).

A commercial power having a voltage of 120 V and a frequency of 60 Hz supplied power to a heater. As illustrated in FIG. 4, a controller controlled the heater basically under the feedback control and the feedforward control. While the fixing device was in the heated state, the controller retained a duty cycle of 20% under the phase control.

According to the embodiment 1, the controller started supplying power to the heater under the phase control at a first time that was prior to a second time by one control cycle. The second time was prior to a nip entry time at which a sheet entered a fixing nip by a delay time period. For example, the one control cycle was 167 msec. Conversely, according to the comparative example 1, the controller started supplying power to the heater under the phase control at the second time that was prior to the nip entry time at which the sheet entered the fixing nip by the delay time period. The delay time period was 0.5 seconds.

Figure 9:
FIG. 9 is a graph illustrating a relation between a number of jobs and a temperature of the fixing belt according to an embodiment 1 and a comparative example 1.
Figure 10:
FIG. 10 is a graph illustrating a relation between the number of jobs and a glossiness of an image formed on a sheet according to the embodiment 1 and the comparative example 1.

The fixing devices according to the embodiment 1 and the comparative example 1 fixed the toner images on the sheets, respectively, with the constructions and conditions described above. The glossiness of each of the toner images fixed on the sheets was measured. The glossiness was measured with a photometer PG-1 that measured an angle of 60 degrees and was manufactured by Nippon Denshoku Industries Co., Ltd. FIG. 9 illustrates the temperature of the fixing belt, that changes depending on a number of jobs according to the embodiment 1 and the comparative example 1. FIG. 10 illustrates the glossiness of the toner image formed on the sheet, that changes depending on the number of jobs according to the embodiment 1 and the comparative example 1. FIG. 9 illustrates a proper temperature of zero degree of the fixing belt. The temperature of the fixing belt depicted in FIG. 9 is a relative value of a temperature of an upstream portion of the fixing belt, that is disposed upstream from the fixing nip in the sheet conveyance direction. The relative value is defined by temperature deviation from the proper temperature. In FIGS. 9 and 10, a solid line represents the embodiment 1 and a dotted line represents the comparative example 1.

As illustrated in FIGS. 9 and 10, while the fixing devices performed a first job to a fifteenth job, the fixing devices were in the cool state in which the fixing devices stored heat insufficiently. While the fixing devices were in the cool state, a substantial difference in the temperature of the fixing belt and the glossiness of the toner image did not appear between the fixing device according to the embodiment 1 and the fixing device according to the comparative example 1. Conversely, while the fixing devices performed a twentieth job and following jobs, the fixing device according to the comparative example 1 suffered from substantial temperature decrease of the fixing belt, resulting in decrease in the glossiness of the toner image. While the fixing devices performed the twentieth job and the following jobs, the fixing devices were in the heated state in which the fixing devices stored heat sufficiently. Hence, the fixing belt of each of the fixing devices retained a fixing temperature at which the fixing belt fixed the toner images on the sheets properly, generating a section having a duty cycle of zero. Accordingly, as described above, if the controller resets a control cycle as the sheet enters the fixing nip under the phase control at a duty cycle of 20%, the controller may supply power to the heater in a decreased amount. For example, according to the comparative example 1, the controller started supplying power to the heater under the phase control at the time that was prior to the nip entry time of the sheet by the delay time period. Accordingly, the controller did not start supplying power to the heater under the half-wave control following the phase control at the time that was prior to the nip entry time by the delay time period. Consequently, according to the comparative example 1, the controller did not conceivably supply a predetermined amount of power to the heater at a proper time, causing temperature decrease of the fixing belt. Conversely, according to the embodiment 1, after the controller continued supplying power to the heater under the phase control for one control cycle, the controller started supplying the predetermined amount of power to the heater under the half-wave control at the time that was prior to the nip entry time at which the sheet entered the fixing nip by the delay time period, thus suppressing temperature decrease of the fixing belt and improving the glossiness of the toner image on the sheet.

A description is provided of the comparison test with an embodiment 2 of the present disclosure and a comparative example 2.

Unlike the embodiment 1 and the comparative example 1, the embodiment 2 and the comparative example 2 used a commercial power having a frequency of 50 Hz. According to the embodiment 2, the controller started supplying power to the heater under the phase control at a first time that was prior to a second time by two control cycles of 400 msec. The second time was prior to a nip entry time at which a sheet entered the fixing nip by a delay time period. Conversely, according to the comparative example 2, the controller started supplying power to the heater under the phase control at the second time that was prior to the nip entry time at which the sheet entered the fixing nip by the delay time period. Other construction and conditions were equivalent to the construction and the conditions of the embodiment 1 and the comparative example 1.

Figure 11:
FIG. 11 is a graph illustrating the relation between the number of jobs and the temperature of the fixing belt according to an embodiment 2 and a comparative example 2.
Figure 12:
FIG. 12 is a graph illustrating the relation between the number of jobs and the glossiness of the image formed on the sheet according to the embodiment 2 and the comparative example 2.

FIG. 11 illustrates the temperature of the fixing belt, that changes depending on the number of jobs according to the embodiment 2 and the comparative example 2. FIG. 12 illustrates the glossiness of the toner image formed on the sheet, that changes depending on the number of jobs according to the embodiment 2 and the comparative example 2. The temperature of the fixing belt depicted in FIG. 11 is also the relative value of the temperature of the upstream portion of the fixing belt, that is disposed upstream from the fixing nip in the sheet conveyance direction. The relative value is defined by temperature deviation from the proper temperature. In FIGS. 11 and 12, a solid line represents the embodiment 2 and a dotted line represents the comparative example 2.

As illustrated in FIGS. 11 and 12, while the fixing device according to the comparative example 2 performed the twentieth job and the following jobs, the fixing device according to the comparative example 2 suffered from substantial temperature decrease of the fixing belt compared to the fixing device according to the embodiment 2, resulting in decrease in the glossiness of the toner image. Additionally, the fixing device according to the comparative example 2 suffered from temperature decrease and glossiness degradation that were greater than temperature decrease and glossiness degradation of the fixing device according to the comparative example 1. The fixing device according to the comparative example 2 used the commercial power having the frequency of 50 Hz. Hence, compared to the fixing device according to the comparative example 1 that used the commercial power having the frequency of 60 Hz, the fixing device according to the comparative example 2 increased the control cycle and a time period for which the phase control continued. Additionally, under the half-wave control, the controller according to the comparative example 2 did not conceivably supply the predetermined amount of power to the heater at a proper time. Conversely, the fixing device according to the embodiment 2 suppressed temperature decrease of the fixing belt and improved the glossiness of the toner image on the sheet. After the controller according to the embodiment 2 continued the phase control for two control cycles, the controller conceivably started supplying the predetermined amount of power to the heater under the half-wave control at the time that was prior to the nip entry time at which the sheet entered the fixing nip by the delay time period.

A description is provided of the comparison test with an embodiment 3 of the present disclosure and a comparative example 3.

In the comparison test with the embodiment 3 and the comparative example 3, when 50 sheets as plain paper having a B4 size were conveyed through the fixing devices from a time at which the fixing devices were in the cool state, the temperature of the fixing belt of each of the fixing devices and the glossiness of toner images formed on the sheets were measured.

Figure 13:
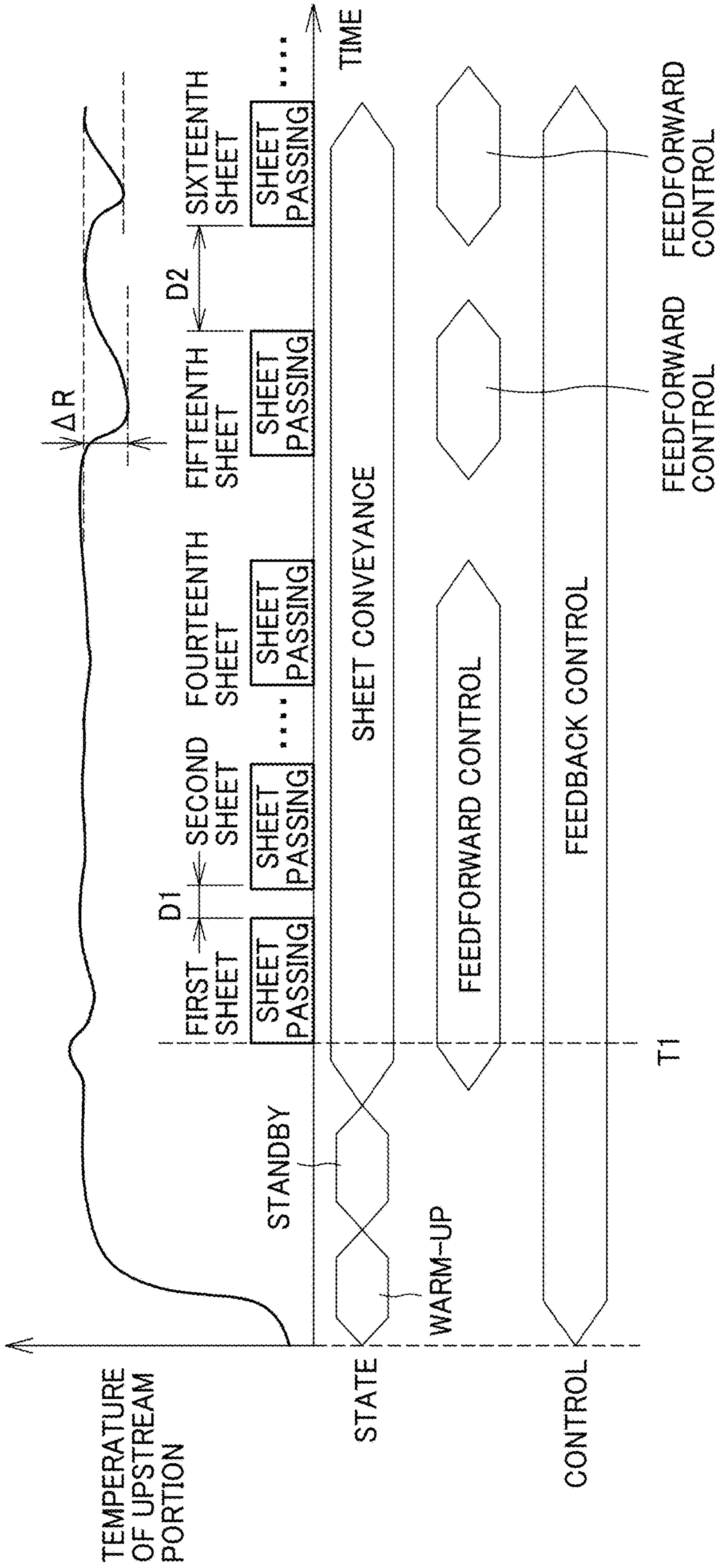
FIG. 13 is a timing chart illustrating conveyance of plain paper having a B4 size through the fixing device depicted in FIG. 2 and the temperature control of the fixing device.

FIG. 13 is a timing chart illustrating conveyance of sheets as plain paper having the B4 size through the fixing device and the temperature control of the fixing device.

The sheet having the B4 size has a width smaller than an entire width of a heat generation portion of the heater in a direction perpendicular to the sheet conveyance direction.

Hence, the sheet is not conveyed over a non-conveyance span disposed in each lateral end portion of the fixing belt in the direction perpendicular to the sheet conveyance direction. Accordingly, the fixing belt in the non-conveyance span may suffer from substantial temperature increase. Consequently, the fixing belt may not fix the toner image on the sheet properly. Additionally, the fixing belt may suffer from degradation or damage. To address the circumstance, while the sheets are conveyed continuously, an interval with which the sheets are conveyed increases from an interval D1 to an interval D2 that is greater than the interval D1 by decreasing a conveyance speed defined by pages per minute (PPM), thus suppressing temperature increase in the non-conveyance span on the fixing belt. For example, according to the embodiment 3 and the comparative example 3, a first sheet to a fourteenth sheet were conveyed at 25 PPM. A fifteenth sheet and following sheets were conveyed at 17 PPM. During the interval D2 when the fifteenth sheet and the following sheets were conveyed at the decreased PPM, the controller controlled the heater under the feedback control to prevent the heater from supplying heat excessively. At a time when the following sheet passed through the fixing nip, the controller performed the feedforward control and the feedback control at a fixed duty cycle.

Like the controller according to the embodiment 1, the controller according to the embodiment 3 started supplying power to the heater under the phase control at a first time that was prior to a second time by one control cycle. The second time was prior to a nip entry time at which a sheet entered the fixing nip by a delay time period. Conversely, according to the comparative example 3, the controller started supplying power to the heater under the phase control at the second time that was prior to the nip entry time at which the sheet entered the fixing nip by the delay time period. Other construction and conditions were equivalent to the construction and the conditions of the embodiment 1 and the comparative example 1.

Figure 14:
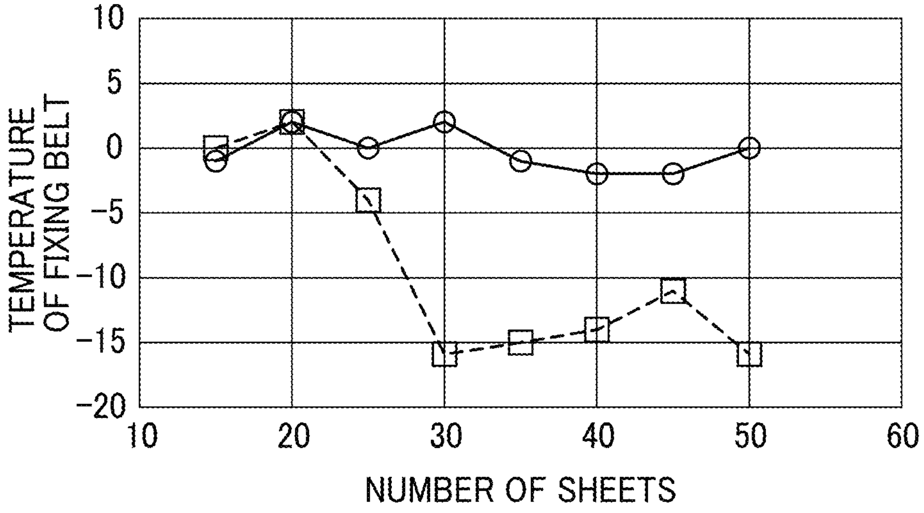
FIG. 14 is a graph illustrating a relation between a number of sheets conveyed through the fixing device and the temperature of the fixing belt according to an embodiment 3 and a comparative example 3.
Figure 15:
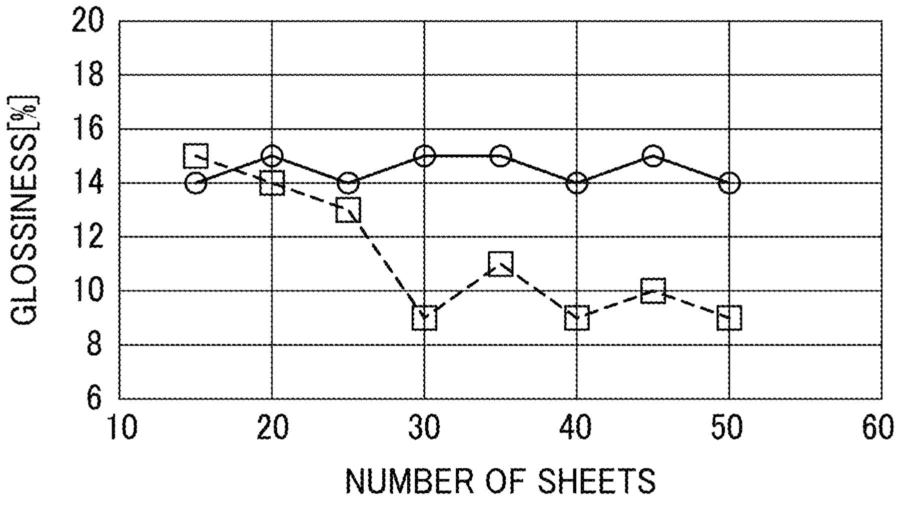
FIG. 15 is a graph illustrating the relation between the number of sheets conveyed through the fixing device and the glossiness of the image formed on the sheet according to the embodiment 3 and the comparative example 3.

FIG. 14 illustrates the temperature of the fixing belt, that changes depending on a number of sheets conveyed through the fixing device according to the embodiment 3 and the fixing device according to the comparative example 3. FIG. 15 illustrates the glossiness of the toner image formed on the sheet, that changes depending on the number of sheets conveyed through the fixing device according to the embodiment 3 and the fixing device according to the comparative example 3. The temperature of the fixing belt depicted in FIG. 14 is also the relative value of the temperature of the upstream portion of the fixing belt, that is disposed upstream from the fixing nip in the sheet conveyance direction. The relative value is defined by temperature deviation from the proper temperature. In FIGS. 14 and 15, a solid line represents the embodiment 3 and a dotted line represents the comparative example 3.

As illustrated in FIGS. 14 and 15, after conveyance of the sheets started, from the first sheet to the twentieth sheet, a substantial difference in the temperature of the fixing belt and the glossiness of the toner image did not appear between the fixing device according to the embodiment 3 and the fixing device according to the comparative example 3. Conversely, while the fixing devices conveyed a twenty-fifth sheet and following sheets, the fixing device according to the comparative example 3 suffered from substantial temperature decrease of the fixing belt, resulting in decrease in the glossiness of the toner image. While the fixing devices conveyed the twenty-fifth sheet and the following sheets, an amount of heat stored in the fixing devices increased substantially. For example, heat was not conducted to the sheets during the interval D2. As heat was conducted from the non-conveyance span to a sheet conveyance span where the sheets were conveyed over the fixing belt, the controller might supply power to the heater at a decreased duty cycle, generating a section having a duty cycle of zero. Hence, according to the comparative example 3, after generation of the section having the duty cycle of zero while the twenty-fifth sheet and the following sheets were conveyed, the controller conceivably failed to change to the phase control and start supplying power to the heater under the half-wave control following the phase control at the time that was prior to the nip entry time of the sheet by the delay time period, causing temperature decrease of the fixing belt. Conversely, according to the embodiment 3, after the controller continued supplying power to the heater under the phase control for one control cycle, the controller started supplying the predetermined amount of power to the heater under the half-wave control at the proper time that was prior to the nip entry time at which the sheet entered the fixing nip by the delay time period, conceivably suppressing temperature decrease of the fixing belt and improving the glossiness of the toner image on the sheet.

As described above, according to the embodiments of the present disclosure, in a case that the controller 33 switches from the phase control serving as the first heating to the half-wave control serving as the second heating immediately before the sheet P enters the fixing nip N, the controller 33 starts the half-wave control at the time T2 that is prior to the nip entry time T1 at which the sheet P enters the fixing nip N by the delay time period L. Thus, the controller 33 supplies the predetermined amount of power to the heater 23 at the proper time, suppressing temperature decrease of the fixing rotator 21 and improving fixing of the toner image T on the sheet P. Additionally, according to the embodiments of the present disclosure, the controller 33 continues the phase control immediately before the half-wave control for one control cycle or longer at a duty cycle not greater than 40%, suppressing flickers effectively.

An upper limit of the duty cycle of the phase control is not greater than 40%. The controller 33 performs the phase control at the duty cycle not greater than 40%, suppressing flickers effectively. Conversely, a lower limit of the duty cycle is preferably not smaller than 10%. In a case that the halogen heater as the heater 23 is turned on and off repeatedly in shortened cycles at the duty cycle smaller than 10%, a halogen cycle may be incomplete, shortening a life of a filament. The halogen cycle defines a thermochemical cyclic reaction between evaporated tungsten from the filament and halogen gas filling a halogen lamp. Hence, the lower limit of the duty cycle under the phase control is not smaller than 10% that achieves a proper halogen cycle.

As the control cycle of each of the phase control serving as the first heating and the half-wave control serving as the second heating, continuous 20 half waves generated by the alternating current power supply 40 may be one control cycle. In a case that the alternating current power supply 40 has the frequency of 50 Hz, the control cycle of each of the phase control serving as the first heating and the half-wave control serving as the second heating may be 200 msec. In a case that the alternating current power supply 40 has the frequency of 60 Hz, the control cycle of each of the phase control serving as the first heating and the half-wave control serving as the second heating may be 167 msec. Accordingly, the controller 33 achieves both suppressing flickers and improving fixing of the toner image T on the sheet P regardless of a frequency band.

Application of the embodiments of the present disclosure is not limited to the fixing device 20 depicted in FIG. 2, that incorporates the single heater 23. The embodiments of the present disclosure are also applied to a fixing device incorporating a plurality of heaters. For example, the embodiments of the present disclosure are also applied to a fixing device that includes, as heaters, a first halogen heater and a second halogen heater. The first halogen heater is disposed opposite and heats a center span of the fixing rotator 21 in the longitudinal direction thereof. The second halogen heater is disposed opposite and heats both lateral end spans of the fixing rotator 21 in the longitudinal direction thereof. The fixing device that incorporates the plurality of heaters and is applied with any one of the embodiments of the present disclosure also achieves both suppressing flickers and improving fixing of the toner image T on the sheet P.

With the embodiments of the present disclosure described above, the technology of the present disclosure encompasses a fixing device (e.g., the fixing device 20) and an image forming apparatus (e.g., the image forming apparatus 1000) that have at least one of aspects described below.

A description is provided of a first aspect of the technology of the present disclosure.

As illustrated in FIGS. 2 and 3, the fixing device includes a pair of rotators, that is, a first rotator (e.g., the fixing rotator 21) and a second rotator (e.g., the pressure rotator 22), a heater (e.g., the heater 23), and a controller (e.g., the controller 33). The second rotator contacts the first rotator to form a nip (e.g., the fixing nip N) between the first rotator and the second rotator. The heater heats at least one of the first rotator or the second rotator. The controller controls the heater to switch between a first heating and a second heating. The first rotator and the second rotator fix an image (e.g., the toner image T) on a recording medium (e.g., the sheet P) that enters the nip under heat. As illustrated in FIG. 7, immediately before the recording medium enters the nip, the controller controls the heater to switch from the first heating to the second heating. The controller starts the second heating at a time (e.g., the time T2) prior to a nip entry time (e.g., the nip entry time T1) at which the recording medium enters the nip by a delay time period (e.g., the delay time period L) taken for the heater to conduct heat to the nip. The controller controls the heater to continue the first heating immediately before the second heating for at least one control cycle (e.g., the one control cycle Tperiod) at a duty cycle of power supplied to the heater. The duty cycle is not greater than 40%.

A description is provided of a second aspect of the technology of the present disclosure.

As illustrated in FIG. 7, in the fixing device according to the second aspect based on the first aspect, the controller controls the heater to continue the first heating immediately before the second heating for at least one control cycle at a duty cycle of the power supplied to the heater. The duty cycle is not smaller than 10% and not greater than 40%.

A description is provided of a third aspect of the technology of the present disclosure.

As illustrated in FIG. 3, the fixing device according to the third aspect based on the first aspect or the second aspect further includes an alternating current power supply (e.g., the alternating current power supply 40), a switch (e.g., the switch 31), and a zero-crossing detector (e.g., the zero-crossing detector 32). The switch switches between supply and interruption of the power from the alternating current power supply to the heater. The zero-crossing detector detects a zero-crossing time of an alternating current generated by the alternating current power supply. The first heating defines a phase control under which the controller controls the switch to supply the power to the heater at a predetermined phase angle of one half wave of the alternating current generated by the alternating current power supply based on the zero-crossing time. The second heating defines a half-wave control under which the controller controls the switch to perform one of full power supply and interruption of power supply to the heater per one half wave of the alternating current generated by the alternating current power supply based on the zero-crossing time.

A description is provided of a fourth aspect of the technology of the present disclosure.

In the fixing device according to the fourth aspect based on any one of the first aspect to the third aspect, as a control cycle of each of the first heating and the second heating, continuous 20 half waves of the alternating current generated by the alternating current power supply define one control cycle. In a case that the alternating current power supply has a frequency of 50 Hz, the control cycle of each of the first heating and the second heating is 200 msec. In a case that the alternating current power supply has a frequency of 60 Hz, the control cycle of each of the first heating and the second heating is 167 msec.

A description is provided of a fifth aspect of the technology of the present disclosure.

In the fixing device according to the fifth aspect based on any one of the first aspect to the fourth aspect, the controller controls the heater to continue the first heating immediately before the second heating for a time period defined by an arbitrary integral multiple of one control cycle at a duty cycle of the power supplied to the heater. The duty cycle is not greater than 40%.

A description is provided of a sixth aspect of the technology of the present disclosure.

As illustrated in FIGS. 1 and 2, an image forming apparatus (e.g., the image forming apparatus 1000) according to the sixth aspect includes an image forming device (e.g., the image forming portion 100) and the fixing device according to any one of the first aspect to the fifth aspect. The image forming device forms an image (e.g., the toner image T) on a recording medium (e.g., the sheet P). The fixing device fixes the image on the recording medium.

Accordingly, the fixing device suppresses flickers and improves fixing of the image on the recording medium.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. A fixing device comprising:

a first rotator;

a second rotator to contact the first rotator to form a nip between the first rotator and the second rotator, the first rotator and the second rotator to fix an image on a recording medium that enters the nip under heat;

a heater to heat at least one of the first rotator or the second rotator; and a controller to:

control the heater to switch between a first heating and a second heating;

control the heater to switch from the first heating to the second heating before the recording medium enters the nip;

control the heater to start the second heating at a time prior to a nip entry time at which the recording medium enters the nip by a delay time period taken for the heater to conduct heat to the nip; and control the heater to continue the first heating before the second heating for at least one control cycle at a duty cycle of power supplied to the heater, the duty cycle being not greater than 40%.

2. The fixing device according to claim 1, wherein the duty cycle is not smaller than 10%.

3. The fixing device according to claim 1, wherein the controller controls the heater to continue the first heating for a time period defined by an arbitrary integral multiple of one control cycle.

4. The fixing device according to claim 1, further comprising:

an alternating current power supply to supply the power to the heater;

a switch to switch between supply and interruption of the power from the alternating current power supply to the heater; and a zero-crossing detector to detect a zero-crossing time of an alternating current generated by the alternating current power supply.

5. The fixing device according to claim 4, wherein the first heating defines a phase control under which the controller controls the switch to supply the power to the heater at a predetermined phase angle of one half wave of the alternating current generated by the alternating current power supply based on the zero-crossing time, and wherein the second heating defines a half-wave control under which the controller controls the switch to perform one of full supply and interruption of the power to the heater per one half wave of the alternating current generated by the alternating current power supply based on the zero-crossing time.

6. The fixing device according to claim 4, wherein continuous 20 half waves of the alternating current generated by the alternating current power supply define one control cycle as a control cycle of each of the first heating and the second heating, wherein the control cycle of each of the first heating and the second heating is 200 msec in a case that the alternating current power supply has a frequency of 50 Hz, and wherein the control cycle of each of the first heating and the second heating is 167 msec in a case that the alternating current power supply has a frequency of 60 Hz.

7. The fixing device according to claim 1, wherein each of the first rotator and the second rotator includes one of a belt and a roller.

8. An image forming apparatus comprising:

an image forming device to form an image on a recording medium; and a fixing device to fix the image on the recording medium, the fixing device including:

a first rotator;

a second rotator to contact the first rotator to form a nip between the first rotator and the second rotator, the first rotator and the second rotator to fix the image on the recording medium that enters the nip under heat;

a heater to heat at least one of the first rotator or the second rotator; and a controller to:

control the heater to switch between a first heating and a second heating; control the heater to switch from the first heating to the second heating before the recording medium enters the nip;

control the heater to start the second heating at a time prior to a nip entry time at which the recording medium enters the nip by a delay time period taken for the heater to conduct heat to the nip; and control the heater to continue the first heating before the second heating for at least one control cycle at a duty cycle of power supplied to the heater, the duty cycle being not greater than 40%.

* * * * *